United States Patent
Kinter et al.

(10) Patent No.: US 7,769,958 B2
(45) Date of Patent: Aug. 3, 2010

(54) AVOIDING LIVELOCK USING INTERVENTION MESSAGES IN MULTIPLE CORE PROCESSORS

(75) Inventors: Ryan C. Kinter, Seattle, WA (US); Era K. Nangia, Los Altos, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 621 days.

(21) Appl. No.: 11/767,261

(22) Filed: Jun. 22, 2007

(65) Prior Publication Data

US 2008/0320231 A1 Dec. 25, 2008

(51) Int. Cl.
*G06F 12/08* (2006.01)
*G06F 15/167* (2006.01)

(52) U.S. Cl. ......................... 711/141; 711/147

(58) Field of Classification Search .................. None
See application file for complete search history.

(56) References Cited

U.S. PATENT DOCUMENTS

| | | | |
|---|---|---|---|
| 5,572,704 A | 11/1996 | Bratt et al. | |
| 5,632,025 A | 5/1997 | Bratt et al. | |
| 5,740,402 A | 4/1998 | Bratt | |
| 5,941,967 A * | 8/1999 | Zulian | 710/107 |
| 6,643,803 B1 | 11/2003 | Swoboda et al. | |
| 6,681,283 B1 | 1/2004 | Thekkath et al. | |
| 6,732,208 B1 | 5/2004 | Alsaadi et al. | |
| 7,096,289 B2 * | 8/2006 | Brown et al. | 710/107 |
| 2002/0087811 A1 * | 7/2002 | Khare et al. | 711/146 |
| 2004/0083321 A1 * | 4/2004 | McAllister | 710/240 |
| 2004/0093455 A1 * | 5/2004 | Duncan et al. | 710/310 |
| 2007/0043913 A1 * | 2/2007 | Hetherington et al. | 711/141 |
| 2008/0091884 A1 * | 4/2008 | Piry et al. | 711/141 |

OTHER PUBLICATIONS

"International Search Report PCT/US08/67719", Oct. 1, 2008.

* cited by examiner

*Primary Examiner*—Matt Kim
*Assistant Examiner*—Sean Rossiter
(74) *Attorney, Agent, or Firm*—Law Office of Jonathan Hollander PC (57) ABSTRACT

Livelocks are prevented in multiple core processors by canceling data access requests upon determining that they conflict with other data access requests. A requesting processor core sends a data access request potentially causing livelock to a cache coherency manager. A cache coherency manager receives data access requests from multiple processor. The cache coherency manager sends intervention messages to all of the processor cores in response to all data access requests that may cause livelock. Upon receiving an intervention message from the cache coherency manager, the processor core determines if the intervention message corresponds with any of its own pending data access requests. If the intervention message is associated with a data access request conflicting with one of its own pending data access requests, the processor core responds to the invention message by directing the cache coherency manager to cancel its own conflicting pending data access request.

23 Claims, 6 Drawing Sheets

AVOIDING LIVELOCK USING INTERVENTION MESSAGES IN MULTIPLE CORE PROCESSORS

BACKGROUND OF THE INVENTION

The invention relates to the field of microprocessor architectures. Microprocessor designers are continually striving to improve microprocessor performance, designing microprocessor architectures that provide, for example, increased computational abilities, increased operating speeds, reduced power consumption, and/or reduced cost. With many previous microprocessor architectures, it has become increasingly difficult to improve microprocessor performance by increasing their operating frequency. As a result, many newer microprocessor architectures have focused on parallel processing to improve performance.

One parallel processing technique employed in microprocessor architectures is multiple processing cores. This technique utilizes multiple independent processors, referred to as cores, operating in parallel to execute software applications. Two or more processing cores may be implemented within the same integrated circuit die, within multiple integrated circuit dies integrated within the same integrated circuit package, or a combination of these implementations. Typically, multiple processing cores share a common interface and may share memory and other peripheral resources.

Often, a shared resource, such as shared memory or a peripheral, can only be used by one processor core at a time. To control access to shared resources, the processor cores can utilize synchronization primitives such as semaphores, flags, locks, atomic swaps, fetch and increment, or other signaling mechanisms. For example, a memory location may be used as a semaphore to ensure exclusive access to an associated shared resource, such as a critical section or region; a shared portion of memory; or a peripheral resource. A first processor core can check the state of the semaphore to determine if another processor core currently has exclusive access to the resource. If the semaphore value indicates that the resource is available, the first processor core can attempt to write its own indicator value to the semaphore memory location. This will indicate to other processor cores that the first processor core has exclusive access to the resource. The first processor core's write attempt will fail if another processor core modifies the value of the semaphore location before the first processor core's write is complete.

Two or more processor cores may attempt to access a synchronization primitive associated with a critical section or shared resource at approximately the same time. In some situations, each processor core's request for access to the synchronization primitive will cause the other pending access requests for the same memory location to fail. As a result, none of the processor cores will be able to acquire access to the synchronization primitive and its associated critical section or shared resource. Processor cores may then repeat their access requests, causing further access failures. The resulting condition is referred to as a synchronization livelock. In synchronization livelock, the processor cores are stuck in a circular chain of attempting and failing to acquire access to a synchronization primitive associated with a critical section or shared resource. Unless corrective action is taken to end the livelock, all of the involved processor cores may become stuck in a perpetual loop.

It is therefore desirable for systems and methods to prevent or recover from livelock in processors with multiple processor cores. It is further desirable for the systems and methods to have minimal impact on processor performance and complexity. It is further desirable for the systems and methods to work with both single and multithreaded processor cores.

BRIEF SUMMARY OF THE INVENTION

An embodiment of the invention prevents livelocks from occurring in multiple core processors due to data access requests by verifying with a requesting processor core that a data access request is still valid before sending messages to other processor cores that may cause other data access requests to fail. In an embodiment, a cache coherency manager receives data access requests from multiple processor cores and coordinates their execution. Upon receiving a data access request that may potentially cause a livelock, the cache coherency manager first sends an intervention message back to the requesting processor core to confirm that no other processor core has interfered with this data access request, which would cause this data access request to fail.

In an embodiment, if the requesting processor core determines that the data access request is still valid, it responds to the intervention message and directs the cache coherency manager to proceed with the data access request. The cache coherency manager may then send additional intervention messages to the other processor cores to complete the data access request. If the requesting processor core determines that the data access request has become invalid, it responds to the intervention message and directs the cache coherency manager to abandon the data access request. In response, the cache coherency manager will not send any additional intervention messages to other processor cores for this data access request. This prevents the failure of one data access request from cascading and causing failures of other data access requests by other processor cores.

In a further embodiment, the cache coherency manager may alternately send intervention messages to the requesting processor core and additional processor cores at the same time in response to a data access request if the cache coherency manager determines that a livelock situation is unlikely to occur. In an embodiment, the cache coherency manager determines the rate of data access request failures for data access requests that may cause livelock. If the rate of data access request failures exceeds a threshold, which may be predetermined or specified in a program, the cache coherency manager reverts to sending an intervention message first to the requesting processor core to verify the validity of the data access request prior to sending intervention messages to the other processor cores to complete the data access request.

In another embodiment, a requesting processor core sends a data access request potentially causing livelock to a cache coherency manager. The cache coherency manager is adapted to send intervention messages to all of the processor cores in response to all data access requests that may cause livelock. Upon receiving an intervention message from the cache coherency manager, the processor core determines if the intervention message corresponds with any of its own pending data access requests.

If the intervention message is associated with the same memory location and optionally data access request type as one of its own pending data access requests, but does not correspond with one of its own data access requests, the processor core will respond to the intervention message with a request to cancel its own conflicting data access request. In response to the cancellation, the cache coherency manager will cancel the pending data access request from this processor core.

In an embodiment, the cancellation request may include an identifier of the pending data access request. In another embodiment, the cancellation request may omit this identifier. The cache coherency manager will then cancel the next data access request of this type from this processor core that it receives or processes.

BRIEF DESCRIPTION OF THE DRAWINGS

The invention will be described with reference to the drawings, in which.

DETAILED DESCRIPTION OF THE INVENTION

Figure 1:
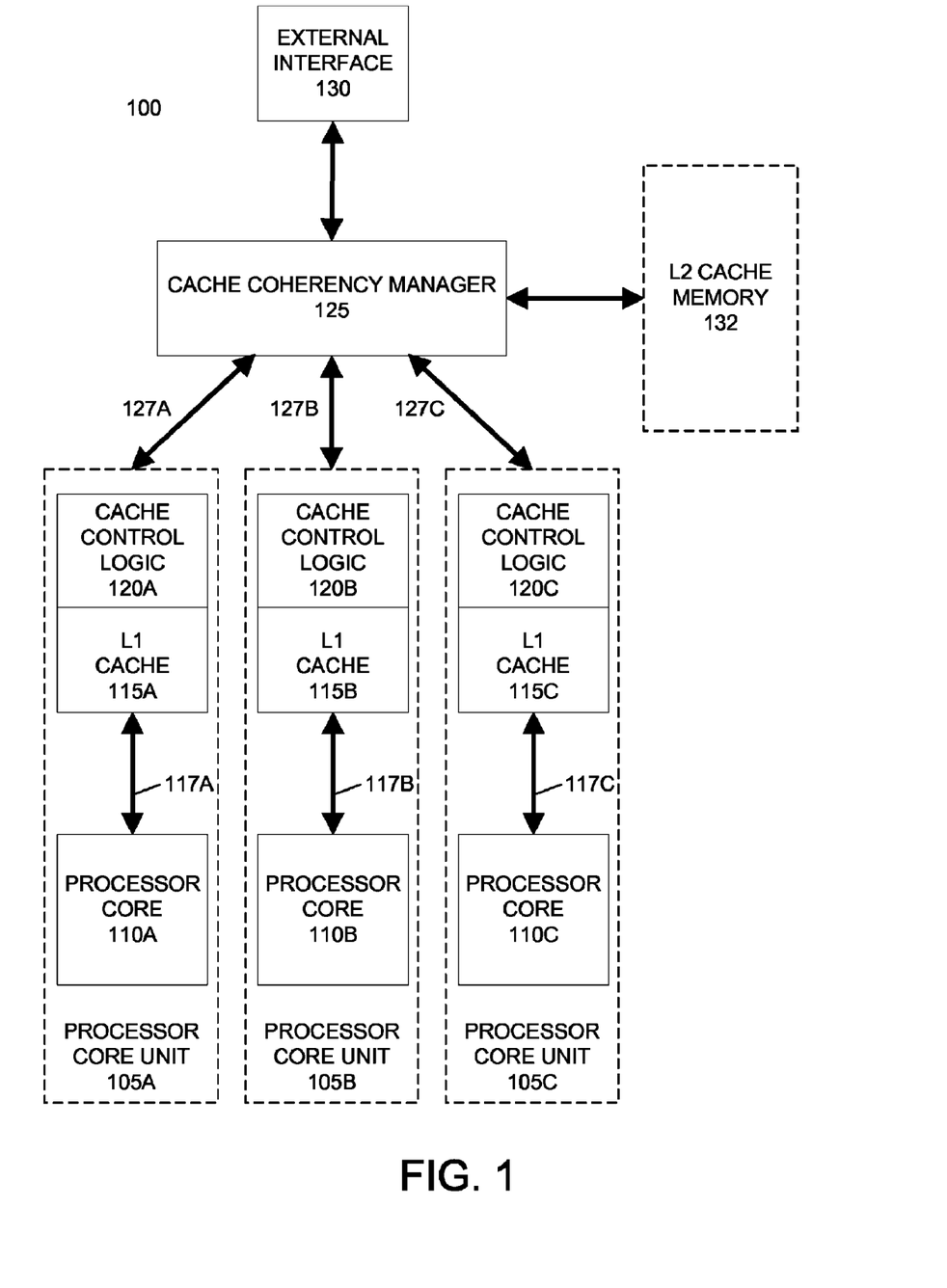
FIG. 1 illustrates an example processor according to an embodiment of the invention.

FIG. 1 illustrates an example processor 100 according to an embodiment of the invention. Embodiments of example processor 100 include two or more processor core units 105, such as processor core units 105A, 105B, and 105C. Each of the processor core units 105 includes at least one processor core. For example, processor core units 105A, 105B, and 105C include processor cores 110A, 110B, and 110C, respectively.

Processor cores 110 are capable of performing one or more information processing functions on data. Processor cores 110 may perform a fixed sequence of functions or be capable of performing a flexible sequence of functions in response to program instructions. Each of the processor cores 110 may be configured according to RISC and/or CISC architectures and may process scalar or vector data types using SISD or SIMD instructions. Processor cores 110 may include general purpose and specialized register files and execution units configured to perform logic functions, arithmetic or other mathematical functions, data manipulation functions, or any other types of functions capable of being implemented using digital logic circuits. Each of the processor cores 110 may have identical functions and capabilities or may have different functions and capabilities specialized for different purposes. Processor cores 110 may be single-threaded or multi-threaded, i.e. capable of executing multiple sequences of program instructions in parallel.

Each of the processor core units 105 include one or more levels of cache memory to temporarily store data potentially needed by its associated processor core. The data stored in the cache memory can include program instructions and/or program data. Typical cache memories are organized into cache lines. Each cache line stores a copy of data corresponding with one or more virtual or physical memory addresses. Each cache line also stores additional data used to manage the cache line, such as cache line tag data used to identify the memory address associated with a cache line and cache coherency data used to synchronize the data in the cache line with other caches and/or with the computer system's memory. The cache tag can be formed from all or a portion of the memory address associated with the cache line.

Example processor core units 105A, 105B, and 105C include L1 cache units 115A, 115B, and 115C, respectively. L1 cache units 115 are connected with their associated processor cores 110 via data buses 117A, 117B, and 117C.

Although shown for clarity as a single bus, each of the data buses 117 may be comprised of one or more data buses between an L1 cache unit and its associated processor core. Embodiments of L1 cache units 115 may also include cache control logic units 120 to facilitate the transfer of data to and from their respective L1 cache units. Cache units 115 may be fully associative, set associative with two or more ways, or direct mapped. For clarity, each of the L1 cache units 115 is illustrated as a single cache memory capable of storing any type of data potentially required by the processor core unit; however, embodiments of the invention can include separate L1 cache units in each processor core unit for storing different types of data separately, such as program instruction caches, program data caches, and translation lookaside buffer data caches.

Cache units 115 are typically partitioned into a number of cache lines, each of which corresponds with a range of adjacent memory locations in shared memory. In an embodiment, each cache line includes cache coherency data that is used to ensure multiple copies of data in memory and in one or more cache lines remains synchronized and accurate. For example, the MESI cache coherency protocol marks cache lines as modified ("M"); exclusive ("E"), which means that the processor core unit has the only cached copy of the data and is free to modify it; shared ("S"), which means that two or more processor core units have cached this data and each processor core can read this data but cannot modify it; or invalid ("I"), which means the data in the cache line is invalid and the processor core unit can store other data in this cache line. Other cache coherency schemes, such as MSI, MOSI, and MOESI coherency schemes, can also be used with embodiments of the invention.

In an embodiment, processor core units 105 are connected with a cache coherency manager unit 125 via data buses 127. Data buses 127 may be implemented as point-to-point data connections between each of the processor core units 105 and the cache coherency manager unit 125, such as data buses 127A, 127B, and 127C. The cache coherency manager unit 125 facilitates the transfer of instructions and/or data between processor core units 105, system memory and I/O via external interface 130, and optionally with a shared L2 cache memory 132.

An embodiment of the cache coherency manager unit 125 can receive system memory read and write requests, read requests from other cache memories, and/or writeback requests from each of the processor core units in parallel and potentially simultaneously. An embodiment of the cache coherency manager unit 125 can process and service these requests in any arbitrary order. For example, an embodiment of the cache coherency manager unit 125 can reorder requests to optimize memory accesses, to load balance requests, to give priority to one or more processor core unit over the other processor core units, and/or to give priority to one or more types of requests over the other types of requests.

In an embodiment, the processor 100 includes an intervention mechanism for maintaining cache coherency and for coordinating data access between processor core units 105. In this embodiment, each processor core unit sends its data access requests to the cache coherency manager 125. Data access requests can include requests for shared access to data, exclusive access to data, writes to shared memory and other system resources, and data writeback operations from one of the processor core units 105 cache memory 115 to an optional shared cache memory 132 or shared system memory.

The cache coherency manager 125 prioritizes data access requests from one or more processor core units 105. For each data access request, the cache coherency manager 125 may send intervention messages to all of the processor core units 105. The message sent to the processor core unit that made the data access request is referred to as a self-intervention message. The intervention or self-intervention message identifies the data associated with the data access request.

Depending upon the type of data access requested, processor core units 105 may respond to intervention messages. For example, if the data access request is for shared access to data, another processor core unit 105 that includes a copy of the requested data in its cache memory 115 will respond to the intervention message by providing the requested data to the cache coherency manager 125. In another example, if the data access request is for exclusive access to data, any other processor core unit that includes a copy of the requested data in its cache memory 115 will respond to the intervention message by invalidating its own copy of the requested data. This preserves data coherency if the requested data is modified. In an embodiment, the self-intervention messages indicate to the requesting processor core unit that the cache coherency manager is currently processing its data access request.

In an embodiment, processor 100 is implemented within an integrated circuit package. Further embodiments of processor 100 may be implemented either within a single integrated circuit die within the integrated circuit package or within multiple integrated circuit dies within a single integrated circuit package.

Figure 2:
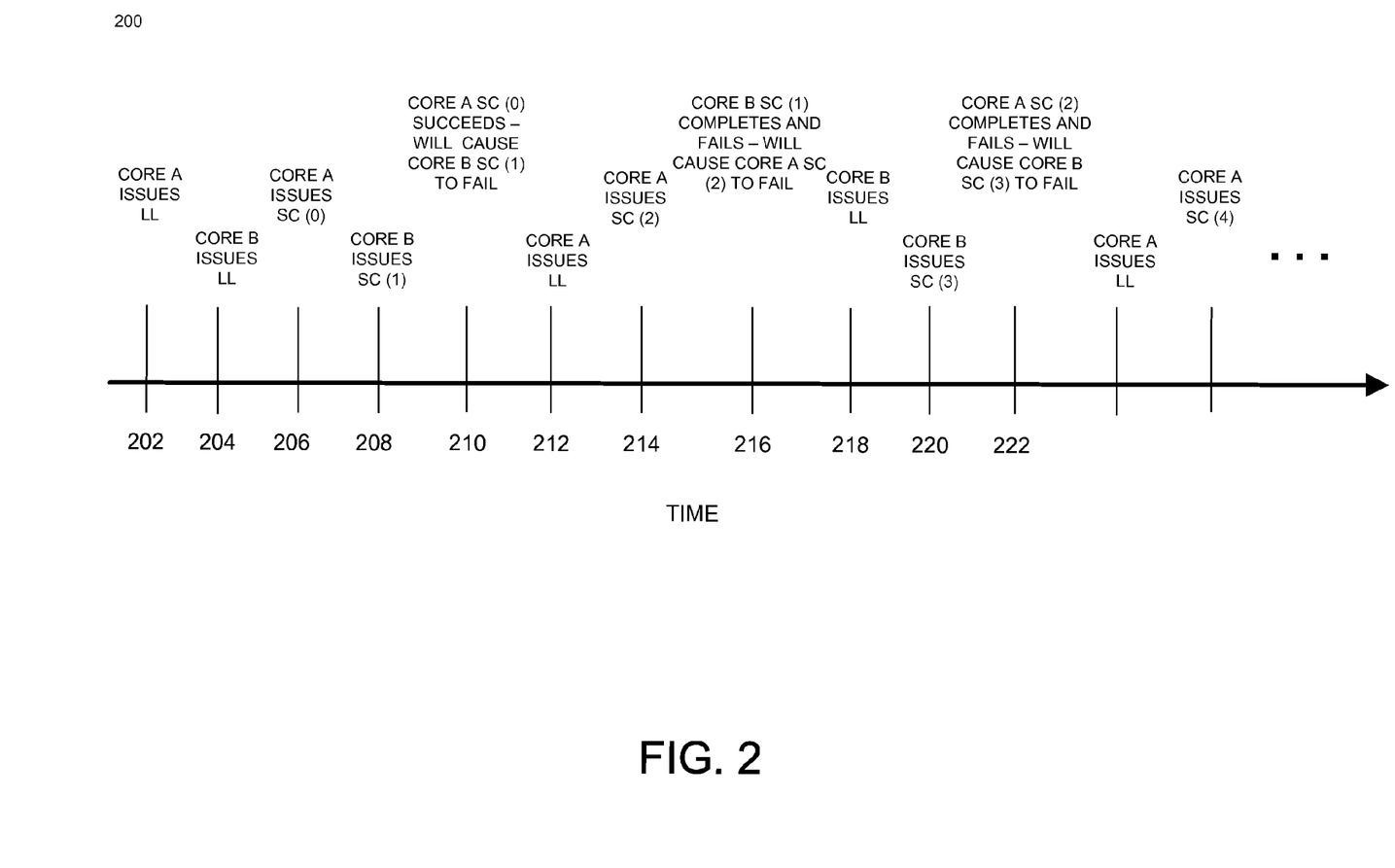
FIG. 2 illustrates an example of livelock in a multiprocessor system.

FIG. 2 illustrates an example of livelock in a multiprocessor system. FIG. 2 includes a timeline 200 showing the ordering of data access requests issued by processor cores executing separate program threads in parallel. In this application, it is assumed that the processor includes multiple processor cores, each executing at least one program thread in parallel. In this example, processor core units use a two-step process to get exclusive access to memory locations used as synchronization primitives, such as semaphores, flags, locks, atomic swaps, fetch and increment, or other signaling mechanisms, used to control access to a critical section or shared resource, such as a portion of memory or a peripheral resource. In this example, a processor core unit first issues a load linked (LL) data access request. The LL data access request retrieves a copy of the data at a shared memory location of the synchronization primitive and stores this data in a processor core unit cache memory. The data is stored as shared data. In an embodiment, the LL data access also sets a flag value in a register of the processor core unit. This flag value will remain set provided no other processor core unit writes to or attempts to write to the memory location used for the synchronization primitive.

Following the LL data access, the processor core unit issues a store conditional (SC) data access request. The SC upgrade data access request attempts to upgrade the cache coherency state of the synchronization primitive data from shared to exclusive and to write a data value into the cache line corresponding with the synchronization primitive memory location. If successful, the SC upgrade data access request will store the data value in the synchronization primitive memory location, indicating to any other processor core units that the synchronization memory location and any associated shared system resource, such as a portion of memory or a peripheral resource, is in use. However, if another processor core unit also attempts to write to the synchronization memory location between the completion of the LL data access and the SC upgrade data access, then the flag value will be reset and the upgrade data access request will fail.

The timeline 200 illustrates an example livelock situation that may occur under this two-step access scheme. At time 202, a first processor core, core A, issues a first LL data access request for a synchronization primitive memory location. Shortly afterwards, at time 204, a second processor core, core B, also issues a LL data access request for the same memory location. Following the completion of the LL data access request, the first processor core, core A, issues an SC upgrade data access request (0) at time 206. At time 208, the second processor core, core B, also issues an SC upgrade data access request (1). At time 210, core A's SC upgrade data access request (0) succeeds and writes a synchronization data value to the synchronization primitive memory location. This will eventually cause the upgrade data access request (1) from core B to fail.

At time 212, core A issues another LL data access request to regain access to the shared resource. At time 214, core A issues another SC upgrade request (2). At time 216, the upgrade request (1) from core B completes. It has already failed, but core A is not aware of this and will mark its currently pending SC upgrade request (2) to fail due to the SC upgrade request (1) from core B. After the SC upgrade request (1) from core B fails at time 216, core B will make another attempt to access the synchronization primitive by issuing LL request at time 218 and the SC upgrade request (3) at time 220. At time 222, the failed SC upgrade request (2) from core A completes and fails, and this causes the pending SC upgrade request (3) from core B to fail.

In response to the failure of SC upgrade request (2), core A will attempt to reaccess the synchronization primitive by issuing additional LL and SC upgrade requests. The processor cores A and B can attempt to repeat their LL data access and SC upgrade requests for the synchronization primitive, which will fail again for the same reasons. This pattern of repeated SC upgrade data access request failures can continue indefinitely in a similar fashion for processor cores A and B. This situation is referred to as livelock, as each processor core is blocked from proceeding by another processor core's actions. Livelock can occur in a variety of different conditions and embodiments of the invention are readily adaptable to other livelock examples occurring in other microprocessor and instruction set architectures.

Figure 3:
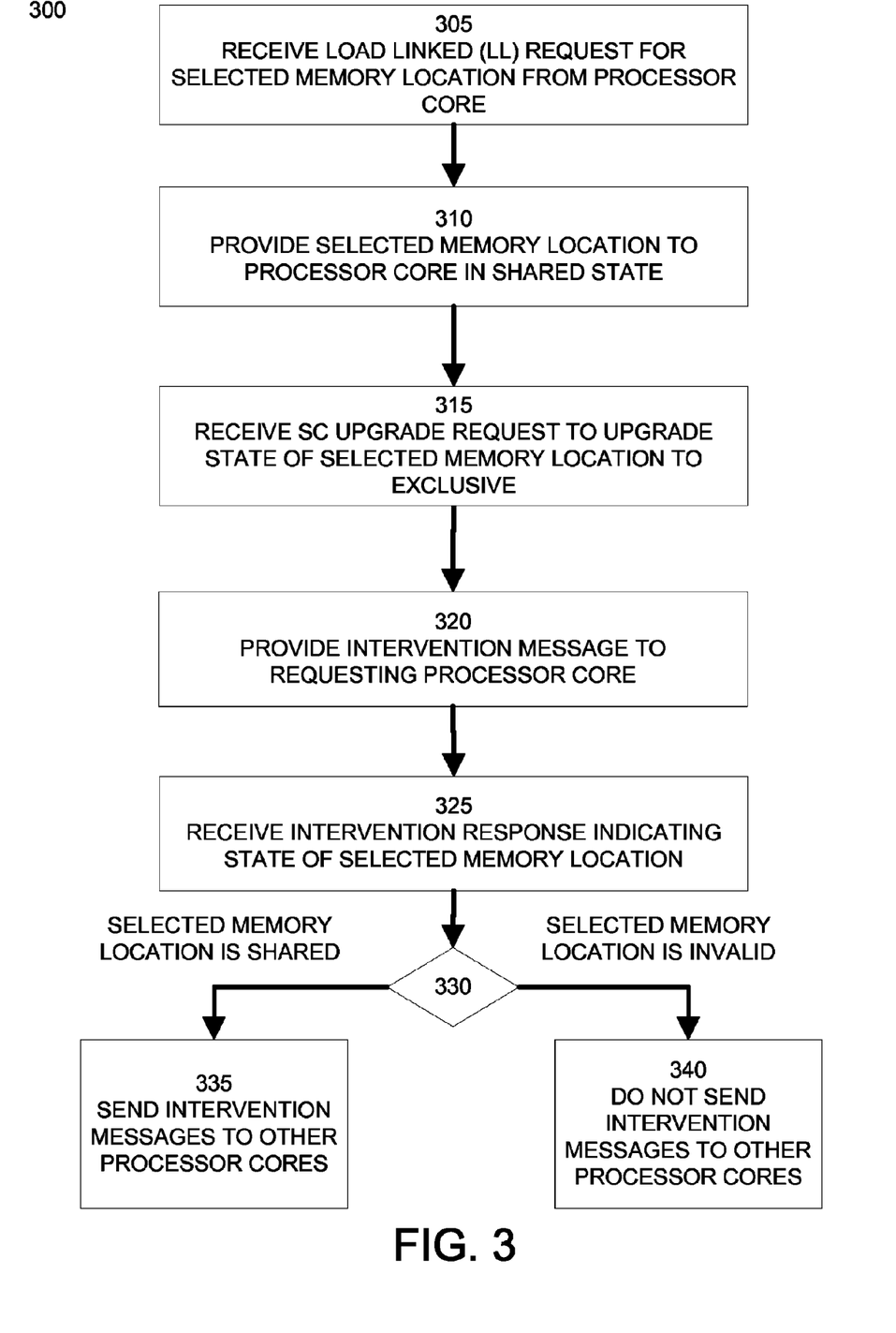
FIG. 3 illustrates a method of preventing livelock according to an embodiment of the invention.

FIG. 3 illustrates a method 300 of preventing livelock according to an embodiment of the invention. In step 305, a cache coherency manager receives a LL data access request for a selected memory location or other data access request capable of causing livelock from a processor core. In response to the data access request, at step 310 the cache coherency manager provides the data from the selected memory location to the requesting processor core.

In step 315, the cache coherency manager receives a SC upgrade data access request for the selected memory location from the same processor core. In response, the cache coherency manager sends a self-intervention message back to the requesting processor core in step 320.

At this time, the cache coherency manager does not send further intervention messages associated with the SC upgrade data access request to other processor cores. Instead, the cache coherency manager waits in step 325 to receive an intervention message response to the self-intervention message sent to the requesting processor core. The intervention message response received in step 325 includes an indicator of the cache coherency state of the selected memory location associated with the SC upgrade data access request. In an embodiment, program execution for the program thread issuing the SC upgrade data access request is halted on the processor core from the time the SC upgrade request is sent to the coherency manager until the corresponding self-intervention message is returned and processed.

Decision block 330 evaluates the indicator of the cache coherency state of the selected memory location provided by the intervention message response. If the cache coherency state is indicated to be shared, then in step 335 the cache coherency manager continues processing the SC upgrade data access request by sending associated intervention messages to the other processor cores. Conversely, if the cache coherency state is indicated to be invalid, then some other processor core has attempted to access the same memory location. As a result, the cache coherency manager in step 340 abandons the pending SC upgrade data access request and does not send any associated intervention messages to the other processor cores.

In a further embodiment of method, the requesting processor core is informed by the cache coherency manager that its SC upgrade data access request has failed. In another embodiment, the requesting processor core deduces that its pending SC upgrade data access request will fail upon receiving an associated self-intervention message and determining that the selected memory location has an invalid cache coherency state. In either case, the program thread that issued the SC upgrade request may resume execution at this point.

In method 300, intervention messages associated with a pending SC upgrade data access request to other processor cores are held back by the cache coherency manager until an intervention response message from the requesting processor core confirms that the SC upgrade data access request will succeed. This prevents the intervention messages from triggering a cascade of SC upgrade failures in other processor cores.

An embodiment of method 300 requires the cache coherency manager to maintain a set of pending intervention messages that may be sent to other processor cores after receiving a response to the self-intervention message. This embodiment may decrease performance or increase complexity of data processing pipelines in the cache coherency manager.

To improve performance and reduce data processing pipeline complexity, a further embodiment of the cache coherency manager selectively activates or deactivates method 300 depending upon the likelihood of livelock occurring. In this embodiment, a counter or other indicator of potential livelock situations is maintained by the cache coherency manager. When a SC data access upgrade request fails, this counter is incremented. When a SC upgrade data access request succeeds, this counter is decremented.

While this livelock counter or indicator is below a first threshold value, the cache coherency manager assumes that there is a low likelihood of livelock. In this situation, the cache coherency manager unconditionally sends both a self-intervention message and intervention message associated with an SC upgrade data access request to all of the processor cores, rather than holding intervention messages back until the intervention message response is received from the requesting processor core.

However, if the counter meets or exceeds the first threshold value, then the cache coherency manager assumes that a livelock situation is likely or has already occurred. In this situation, the cache coherency manager processes LL and SC upgrade data access requests as described in method 300 above. This ensures that eventually some SC upgrade data access requests will succeed, breaking the livelock. In an embodiment, as SC upgrade data access requests start to succeed, the counter or indicator is decremented. Eventually, the counter or indicator will fall below a second threshold value, which may be the same or different than the first threshold value, and the cache coherency manager can begin to process SC upgrade data access requests without method 300. In an alternate embodiment, the cache coherency manager processes SC upgrade data access requests without method 300 if a time period elapses without an SC upgrade data access request failure.

There may be a single counter for tracking SC upgrade request failures for all of the processor core units or, in further embodiments, multiple counters for tracking SC upgrade request failures for subsets of the processor core units, individual processor core units, and/or processor core threads. The use of multiple counters can be used to distinguish between multiple concurrent livelocks and to distinguish resource starvation situations from synchronization livelocks.

Figure 4:
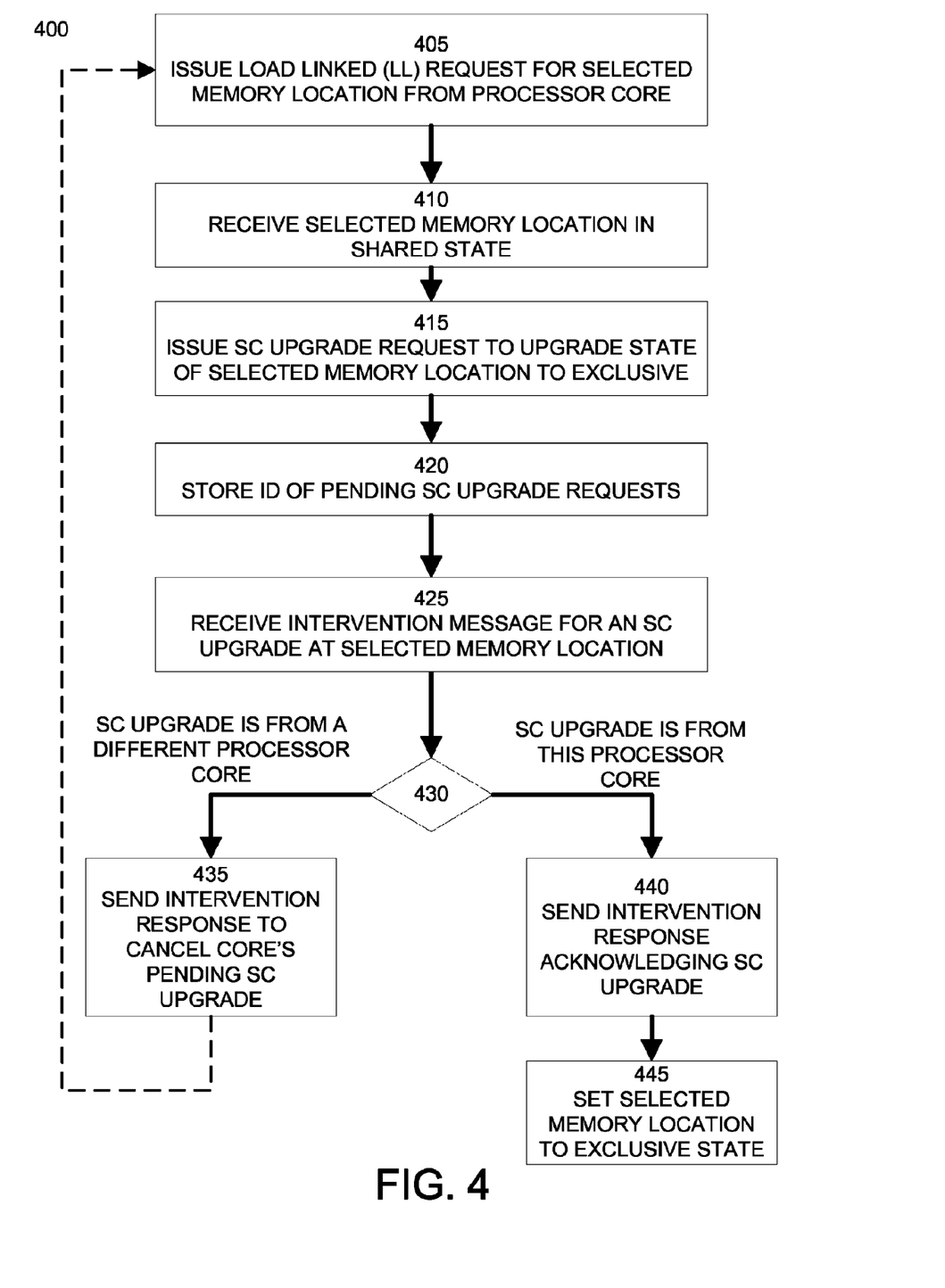
FIG. 4 illustrates a second method of preventing livelock according to an additional embodiment of the invention.

FIG. 4 illustrates a second method 400 of preventing livelock according to an additional embodiment of the invention. Unlike method 300, which is performed primarily by the cache coherency manager, method 400 is performed by a processor core. In step 405, a processor core or processor core unit issues a load linked (LL) data access request for a selected memory location. This data access request is processed by the cache coherency manager and data from the selected memory location is received by the requesting processor core in step 410. The received data is stored in a cache memory in the receiving processor core unit with a shared cache coherency state.

Upon receiving the requested data from the selected memory location, in step 415, the processor core issues an SC upgrade data access request to the cache coherency manager. The SC upgrade data access request attempts to upgrade the cache coherency state of the data in the selected memory location from shared to exclusive, so as to allow the requesting processor core to modify the data in this memory location and to indicate to other processor cores that the shared memory and any associated resources is in use.

While issuing the SC upgrade data access request, the processor core or processor core unit includes an identifier in the SC upgrade data access request. The processor core or processor core unit also stores a copy of this identifier in step 420. In response to SC upgrade data access request from this or any other processor core, the cache coherency manager prioritizes the data access requests and issues corresponding intervention and self-intervention messages to all of the processor core units. In another embodiment, the cache coherency manager may issue corresponding intervention and self-intervention message to all of the processor core units in response to any type of data access request that requests exclusive access to a memory location, not just SC upgrade data access requests.

In an embodiment, program execution for the program thread issuing the SC upgrade data access request is halted on the processor core from the time the SC upgrade request is sent to the coherency manager until the corresponding self-intervention message is returned and processed.

In step 425, the processor core unit receives an intervention message from the cache coherency manager that corresponds with a pending SC upgrade request and is for the selected memory location. This SC upgrade request may correspond with the processor core's own pending SC upgrade request or with the pending SC upgrade request of another processor core for the selected memory location. The intervention message includes a copy of the identifier provided in its corresponding SC upgrade request.

Decision block 430 compares the identifier in the received intervention message with one or more of its stored identifiers for its own pending SC upgrade requests. If the received intervention message identifier does not match a stored identifier, then the intervention message corresponds with an SC upgrade request from a different processor core.

As a result, the processor core in step 435 sends an intervention response message to the cache coherency manager. The intervention response message includes an instruction or indicator that directs the cache coherency manager to cancel its own pending SC upgrade data access request. When the cache coherency manager receives the intervention response message with the cancellation indicator, it will cancel the pending SC upgrade data access request from that processor core. This will prevent the SC upgrade data access request from this processor core from causing other data access requests from other processor cores to fail.

Additionally, the processor core in step 435 will set its own internal registers and flags to indicate that the SC upgrade data access request it previously issued has failed. Program code executed by the processor core can resume execution and respond accordingly, for example by making another attempt to acquire access to this memory location or by executing an error handler routine.

Following step 435, the processor core may optionally proceed back to step 405 to initiate another attempt to acquire exclusive access to the selected memory location. In some embodiments, any repeated attempts to acquire exclusive access to the selected memory location are initiated by the program code executed by the processor core unit. In these embodiments, the program code includes one or more instructions specifying the program's response to the failure of a SC upgrade data access request.

In an embodiment, if the processor core allows only a single outstanding SC upgrade request, as may be the case for a single-threaded processor core, the intervention response message does not need to specifically identify the SC upgrade request to cancel. Instead, the cache coherency manager will cancel the next SC upgrade request it processes from this processor core.

In another embodiment, if the processor core allows multiple outstanding SC upgrade requests, as may be the case for multi-threaded processor cores, the intervention response message includes the identifier associated with the pending SC upgrade request to be cancelled by the cache coherency manager. This ensures that the cache coherency manager does not inadvertently cancel an SC upgrade request from a different execution thread of the processor core.

Conversely, if decision block 430 determines that the identifier in the received intervention message matches one of its stored identifiers for pending SC upgrade data access requests, then the intervention message is a self-intervention message corresponding with a pending SC upgrade data access request from this processor core unit. As a result, the processor core unit proceeds to step 440. Step 440 sends an intervention response message to the cache coherency manager. This intervention response message confirms the SC upgrade data access request. In response, the cache coherency manager completes its processing of the SC upgrade data access request. Also, the processor core unit in step 445 sets the cache coherency state of the selected memory location from shared to exclusive, which establishes the processor core unit's lock on this memory location.

Method 400 prevents livelock by canceling pending SC upgrade data access requests that will cause other data access requests to fail because of previously issued SC upgrade data access requests.

Figure 5:
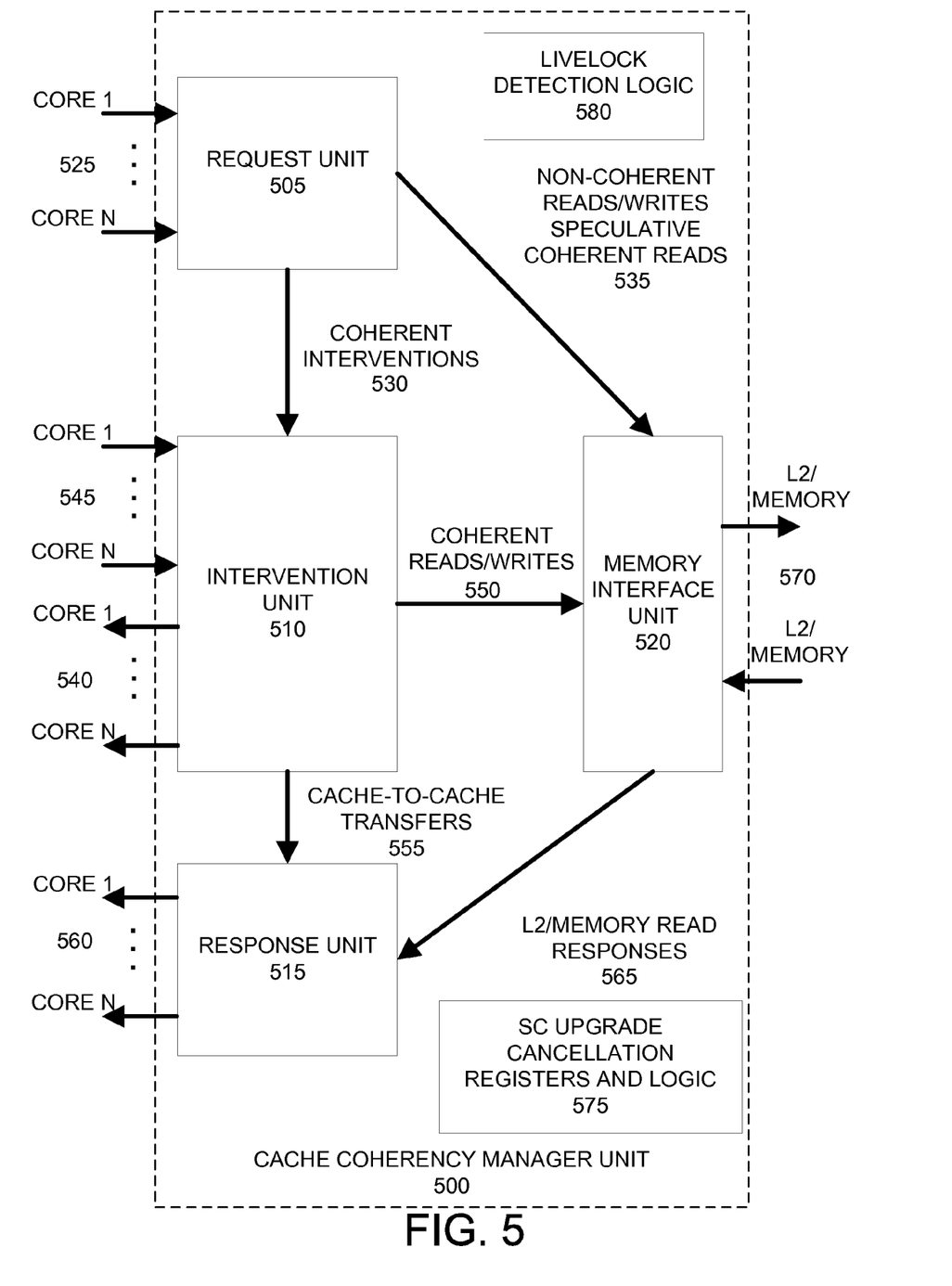
FIG. 5 illustrates a cache coherency manager unit of a processor according to an embodiment of the invention.

FIG. 5 illustrates a cache coherency manager unit 500 of a processor according to an embodiment of the invention. Cache coherency manager unit 500 includes a request unit 505, an intervention unit 510, a response unit 515, and a memory interface unit 520. The request unit includes inputs 525 for receiving read requests, write requests, writeback requests, and other cache memory related requests from N processor core units, where N is any positive integer. The request unit 510 sends non-coherent read and write requests, which are read and write requests that do not require consistency with data in other processor core unit cache memories, and speculative coherent reads to memory interface unit 520 via connection 535. These requests also include explicit and implicit writeback requests of modified cache data. For coherent memory accesses, which require data to be consistent in cache processor core cache memories and system memory, the request unit 505 directs the intervention unit 510 to sends coherent intervention messages, such as self-intervention messages via connection 530.

Intervention unit 510 issues intervention messages, such as self-intervention messages, via outputs 540 to the N processor core units. Intervention messages can also include forwarded requests for data received from other processor core units via request unit 505. The responses to intervention messages, which can include data requested by other processor core units, are received by the intervention unit 510 via inputs 545. If a processor core unit requests data that is stored in the cache of another processor core unit, this data is returned to the intervention unit 510 via inputs 545. The intervention unit 510 then forwards this data to the response unit 515 via connection 555, where it will be communicated back to the requesting processor core unit.

If processor core unit requests data for reading or writing that is not stored in the cache of another processor core unit, then intervention unit 510 can request access to this data by sending a coherent read or write request to memory interface unit 520 via connection 550.

In one embodiment, intervention unit 510 includes logic for issuing a self-intervention message in response to a SC upgrade data access request and in response to receiving an intervention message response that indicates the SC upgrade request is still valid, issuing one or more intervention requests to other processor core units, as described in method 300.

In a further embodiment, cache coherency manager unit 500 includes logic 580 for determining the likelihood of a livelock situation, such as a counter that is incremented in response to SC upgrade request failures and decremented in response to successful SC upgrade requests. In this embodiment, the cache coherency manager unit 500 may also include logic for delaying, inhibiting, or canceling the issuance of intervention messages by the intervention unit 510 in accordance with method 300 when the cache coherency manager unit 500 determines that livelock is likely, such as when the value of the counter exceeds a threshold.

In another embodiment, the cache coherency manager unit 500 can include logic for canceling a received SC upgrade data access request in response to an intervention message response received from a processor core unit. In one implementation, the cache coherency manager unit 500 sets a flag or register value 575 associated with a processor core unit in response to the cancellation instruction or indicator received from that processor core unit. This flag or register value directs the cache coherency manager unit 500 to cancel or discard the next SC upgrade request from this processor core unit that is received or processed by the cache coherency manager unit 500 in accordance with method 400.

In a further embodiment, the cache coherency manager unit 500 stores an identifier in register 575 included with the cancellation instruction or indicator received from a processor core unit. This identifier directs the cache coherency manager unit 500 to cancel or discard a SC upgrade request from a processor core unit that matches the identifier when it is received or processed by the cache coherency manager unit 500 in accordance with method 400.

In some instances, a processor core unit can receive and/or process an intervention message associated with another processor core's SC upgrade request at approximately the same time that its own SC upgrade request for the same memory location is being received and/or processed by the cache coherency manager unit 500. In this situation, the processor core unit's intervention response message with the cancellation message will not arrive back at the cache coherency manager unit 500 in time to cancel the SC upgrade request. To prevent this situation, yet a further embodiment of the cache coherency manager unit 500 includes an intervention unit 510 that is limited to processing intervention messages and intervention message response for only one SC upgrade request at a time. If an additional SC upgrade request is received while the intervention unit 510 is still processing intervention messages or waiting for intervention message responses for a previous SC upgrade request, then the additional SC upgrade request is queued or delayed by the cache coherency manager 500 until the intervention unit 510 completes its processing of the previous SC upgrade request. However, the intervention unit 510 may still process intervention messages and intervention message responses associated with other types of data access requests, such as non-exclusive data access requests from other processor cores, while it is processing intervention messages or waiting for intervention message responses for a SC upgrade request.

The memory interface unit receives non-coherent read and write requests, coherent read and write requests, and write-back requests from the request unit 505 and intervention unit 510. Memory interface unit 520 accesses system memory and/or higher level cache memories, such as an L2 cache memory, via inputs and outputs 570 to fulfill these requests. The data retrieved from system memory and/or higher level cache memory in response to these memory access requests is forwarded to the response unit 515 via connection 565. The response unit 515 returns requested data to the appropriate processor core unit via outputs 560, whether the data was retrieved from another processor core unit, from system memory, or from optional higher-level cache memory.

Figure 6:
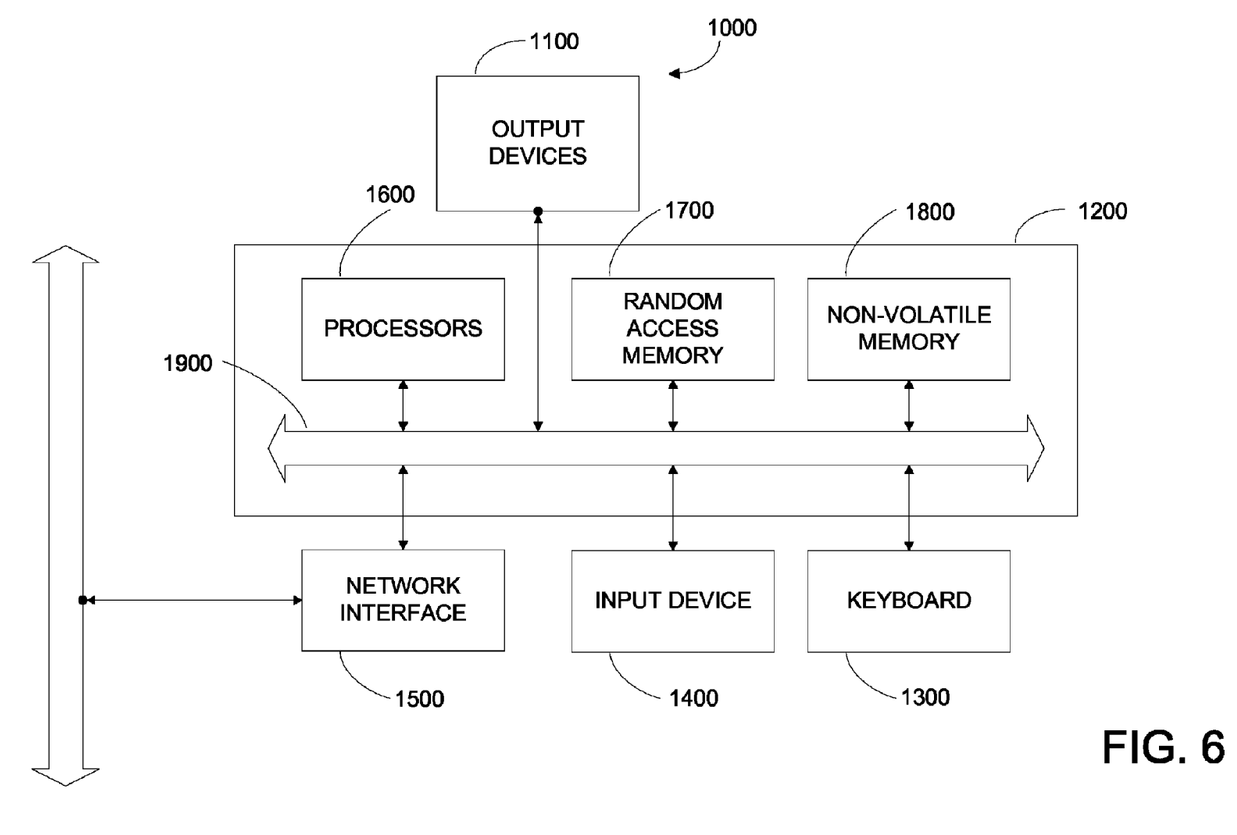
FIG. 6 illustrates an example computer system suitable for use with an embodiment of the invention.

FIG. 6 illustrates an example computer system 1000 suitable for use with an embodiment of the invention. Computer system 1000 typically includes one or more output devices 1100, including display devices such as a CRT, LCD, OLED, LED, gas plasma, electronic ink, or other types of displays, speakers and other audio output devices; and haptic output devices such as vibrating actuators; computer 1200; a keyboard 1300; input devices 1400; and a network interface 1500. Input devices 1400 can include a computer mouse, a trackball, joystick, track pad, graphics tablet, touch screen, microphone, various sensors, and/or other wired or wireless input devices that allow a user or the environment to interact with computer system 1000. Embodiments of network interface 1500 typically provides wired or wireless communication with an electronic communications network, such as a local area network, a wide area network, for example the Internet, and/or virtual networks, for example a virtual private network (VPN). Network interface 1500 can implement one or more wired or wireless networking technologies, including Ethernet, one or more of the 802.11 standards, Bluetooth, and ultra-wideband networking technologies.

Computer 1200 typically includes components such as one or more general purpose processors 1600, and memory storage devices, such as a random access memory (RAM) 1700 and non-volatile memory 1800. Non-volatile memory 1800 can include floppy disks; fixed or removable hard disks; optical storage media such as DVD-ROM, CD-ROM, and bar codes; non-volatile semiconductor memory devices such as flash memories; read-only-memories (ROMS); battery-backed volatile memories; paper or other printing mediums; and networked storage devices. System bus 1900 interconnects the above components. Processors 1600 can include embodiments of the above described processors, such as processors 100, 150, and 400.

RAM 1700 and non-volatile memory 1800 are examples of tangible media for storage of data, audio/video files, computer programs, applet interpreters or compilers, virtual machines, and embodiments of the herein described invention. For example, embodiments of the above described processors may be represented as human-readable or computer-usable programs and data files that enable the design, description, modeling, simulation, testing, integration, and/or fabrication of integrated circuits and/or computer systems including embodiments of the invention. Such programs and data files may be used to implement embodiments of the invention as separate integrated circuits or used to integrate embodiments of the invention with other components to form combined integrated circuits, such as microprocessors, microcontrollers, system on a chip (SoC), digital signal processors, embedded processors, or application specific integrated circuits (ASICs).

Programs and data files expressing embodiments of the invention can use general-purpose programming or scripting languages, such as C or C++; hardware description languages, such as VHDL or Verilog; microcode implemented in RAM, ROM, or hard-wired and adapted to control and coordinate the operation of components within a processor or other integrated circuit; and/or standard or proprietary format data files suitable for use with electronic design automation software applications known in the art. Programs and data files can express embodiments of the invention at various levels of abstraction, including as a functional description, as a synthesized netlist of logic gates and other circuit components, and as an integrated circuit layout or set of masks suitable for use with semiconductor fabrication processes. These programs and data files can be processed by electronic design automation software executed by a computer to design a processor and generate masks for its fabrication.

Further embodiments of computer 1200 can include specialized input, output, and communications subsystems for configuring, operating, simulating, testing, and communicating with specialized hardware and software used in the design, testing, and fabrication of integrated circuits.

Further embodiments can be envisioned to one of ordinary skill in the art from the specification and figures. For example, embodiments of methods 300 and 400 not limited to LL and SC upgrade request instructions and are readily adaptable to other types of instructions, instruction sets, and multithreaded microprocessor architectures in which livelock can occur due to interactions between program threads executed by one or more processor cores. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

It is understood that the apparatus and method described herein may be included in a semiconductor intellectual property core, such as a microprocessor core (e.g. expressed as a hardware description language description or a synthesized netlist) and transformed to hardware in the production of integrated circuits. Additionally, embodiments of the invention may be implemented using combinations of hardware and software, including micro-code suitable for execution within a processor. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of handling data access requests from multiple processor cores by a microprocessor, the method comprising:
   sending from a processor core unit to a cache coherency manager unit a first data access request of a first type and associated with a first memory location;
   receiving at the processor core unit an intervention message from the cache coherency manager unit associated with a data access request and the first memory location;
   determining by the processor core unit if the intervention message corresponds with the first data access request; and
   sending from the processor core unit to the cache coherency manager an intervention message response including a cancellation indicator in response to the determination that the intervention message does not correspond with the first data access request, wherein the cancellation indicator is adapted to direct the cache coherency manager unit to cancel the first data access request.

2. The method of claim 1, wherein the cancellation indicator is adapted to direct the cache coherency manager unit to cancel a data access request of the first type based on its association with a processor core unit.

3. The method of claim 1, wherein the cancellation indicator includes a request identifier, wherein the cancellation indicator is adapted to direct the cache coherency manager unit to cancel a data access request matching the request identifier of the cancellation indicator.

4. The method of claim 3, wherein the first data access request includes the request identifier.

5. The method of claim 1, wherein sending the first data access request comprises:
   sending the first data access request in response to a program executed by a first processor core unit; and
   suspending execution of the program.

6. The method of claim 5, further comprising:
   in response to the determination that the intervention message does not correspond with the first data access request, specifying that the first data access request has failed and resuming execution of the program.

7. The method of claim 1, further comprising:
   sending an intervention message response including a confirmation of the first data access request cancellation indicator to the cache coherency manager in response to the determination that the intervention message corresponds with the first data access request, wherein the intervention message response is adapted to direct the cache coherency manager unit to proceed with the first data access request.

8. The method of claim 7, further comprising:
   setting a memory location associated with the first data access request to exclusive access by a first processor core unit.

9. The method of claim 8, wherein the first data access request includes an upgrade request associated with a SC instruction.

10. A computer-readable storage medium including instructions defining logic circuits of a processor and adapted to be used by an electronic design automation application executed by a computer, wherein the logic circuits are adapted to perform an operation comprising:
    sending from a processor core unit to a cache coherency manager unit a first data access request of a first type and associated with a first memory location;
    receiving at the processor core unit an intervention message from the cache coherency manager unit associated with a data access request and the first memory location;
    determining by the processor core unit if the intervention message corresponds with the first data access request; and
    sending from the processor core unit to the cache coherency manager an intervention message response including a cancellation indicator in response to the determination that the intervention message does not correspond with the first data access request, wherein the cancellation indicator is adapted to direct the cache coherency manager unit to cancel the first data access request.

11. The computer-readable storage medium of claim 10, wherein the cancellation indicator is adapted to direct the cache coherency manager unit to cancel a data access request of the first type based on its association with a processor core unit.

12. The computer-readable storage medium of claim 10, wherein the cancellation indicator includes a request identifier, wherein the cancellation indicator is adapted to direct the cache coherency manager unit to cancel a data access request matching the request identifier of the cancellation indicator.

13. The computer-readable storage medium of claim 12, wherein the first data access request includes the request identifier.

14. The computer-readable storage medium of claim 10, wherein sending the first data access request comprises:
    sending the first data access request in response to a program executed by a first processor core unit; and
    suspending execution of the program.

15. The computer-readable storage medium of claim 14, further comprising:
    in response to the determination that the intervention message does not correspond with the first data access request, specifying that the first data access request has failed and resuming execution of the program.

16. The computer-readable storage medium of claim 10, further comprising:
    sending an intervention message response including a confirmation of the first data access request cancellation indicator to the cache coherency manager in response to the determination that the intervention message corresponds with the first data access request, wherein the intervention message response is adapted to direct the cache coherency manager unit to proceed with the first data access request.

17. The computer-readable storage medium of claim 16, further comprising:
    setting a memory location associated with the first data access request to exclusive access by a first processor core unit.

18. The computer-readable storage medium of claim 16, wherein the first data access request includes an upgrade request associated with a SC instruction.

19. A processor comprising:
    at least two processor core units, wherein at least a portion of the processor core units each comprise:

a processor core adapted to execute program instructions;

a cache memory including cache lines adapted to store cache data; and cache memory control logic; and the cache memory control logic adapted to coordinate communications between the processor core units and memory, wherein the cache memory control logic comprises logic adapted to:

send from a processor core unit to the cache memory control logic a first data access request of a first type and associated with a first memory location;

receive at the processor core unit an intervention message from the cache memory control logic associated with a data access request of the first type and the first memory location;

determine by the processor core unit if the intervention message corresponds with the first data access request; and send from the processor core unit to the cache memory control logic an intervention message response including a cancellation indicator in response to the determination that the intervention message does not correspond with the first data access request, wherein the cancellation indicator is adapted to direct the cache memory control logic to cancel the first data access request.

20. The processor of claim 19, wherein the cancellation indicator is adapted to direct the cache coherency manager unit to cancel a data access request of the first type based on its association with a processor core unit.

21. The processor of claim 19, wherein the cancellation indicator includes a request identifier, wherein the cancellation indicator is adapted to direct the cache coherency manager unit to cancel a data access request matching the request identifier of the cancellation indicator.

22. The processor of claim 19, wherein the logic adapted to send the first data access request comprises logic adapted to:

send the first data access request in response to a program executed by the first processor core unit; and suspending execution of the program.

23. The processor of claim 22, further including logic adapted to specify that the first data access request has failed and to resume execution of the program in response to the determination that the intervention message does not correspond with the first data access request.

* * * * *